United States Patent
Fukunaga (10) Patent No.: US 7,176,993 B2
(45) Date of Patent: Feb. 13, 2007

(54) REFLECTION TYPE DISPLAY DEVICE USING A LIGHT SHADING FILM WITH A LIGHT SHADING MATERIAL EVENLY DISPERSED THROUGHOUT

(75) Inventor: Takeshi Fukunaga, Kanagawa (JP)

(73) Assignee: Semiconductor Energy Laboratory Co., Ltd., Atsugi (JP)

(*) Notice: Subject to any disclaimer, the term of this patent is extended or adjusted under 35 U.S.C. 154(b) by 0 days.

(21) Appl. No.: 10/115,187

(22) Filed: Apr. 2, 2002

(65) Prior Publication Data

US 2002/0109660 A1 Aug. 15, 2002

Related U.S. Application Data

(63) Continuation of application No. 09/605,750, filed on Jun. 27, 2000, now Pat. No. 6,400,434, which is a continuation of application No. 09/018,078, filed on Feb. 3, 1998, now Pat. No. 6,115,094.

(30) Foreign Application Priority Data

Feb. 6, 1997 (JP) .................................. 9-38416

(51) Int. Cl.
G02F 1/1333 (2006.01)
G02F 1/136 (2006.01)
H01L 29/04 (2006.01)

(52) U.S. Cl. .................... 349/111; 349/42; 349/44; 349/138; 257/59

(58) Field of Classification Search ............ 349/138, 349/149, 152, 110, 111, 42–44, 46; 257/59, 257/72; 345/94, 99
See application file for complete search history.

(56) References Cited

U.S. PATENT DOCUMENTS

| 4,408,836 A | 10/1983 | Kikuno ....................... 350/334 |
| 4,832,457 A | 5/1989 | Saitoh et al. ................ 350/334 |
| 4,874,227 A | 10/1989 | Matsukawa et al. ......... 350/334 |
| 4,906,071 A | 3/1990 | Takahara et al. .......... 350/331 R |
| 5,032,531 A | 7/1991 | Tsutsui et al. ................. 437/40 |
| 5,055,899 A | 10/1991 | Wakai et al. ............... 357/23.7 |
| 5,106,197 A | 4/1992 | Ohuchida et al. ............. 359/83 |
| 5,117,299 A | 5/1992 | Kondo et al. |
| 5,121,237 A | 6/1992 | Ikeda et al. ................... 359/67 |

(Continued)

FOREIGN PATENT DOCUMENTS

EP 333208 9/1989

(Continued)

Primary Examiner—Tarifur R. Chowdhury
(74) Attorney, Agent, or Firm—Fish & Richardson P.C.

(57) ABSTRACT

Among insulating layers for insulating and separating first wiring lines, second wiring lines, and pixel electrodes constituting a reflection type display device, at least one layer is made of an insulating film in which a carbon-based material or a pigment is dispersed. By this structure, a conventional step of forming a black mask can be greatly simplified.

36 Claims, 6 Drawing Sheets

U.S. PATENT DOCUMENTS

| | | | |
|---|---|---|---|
| 5,148,301 A | 9/1992 | Sawatsubashi et al. | 359/80 |
| 5,164,853 A | 11/1992 | Shimazaki | 359/82 |
| 5,200,847 A | 4/1993 | Mawatari et al. | 359/59 |
| 5,250,931 A | 10/1993 | Misawa et al. | 345/206 |
| 5,453,858 A | 9/1995 | Yamazaki | 359/59 |
| 5,503,731 A * | 4/1996 | Konuma et al. | 205/98 |
| 5,525,822 A | 6/1996 | Vinal | 257/344 |
| 5,608,557 A | 3/1997 | Wu | 349/42 |
| 5,642,211 A * | 6/1997 | Okano et al. | 349/41 |
| 5,644,370 A | 7/1997 | Miyawaki et al. | 349/43 |
| 5,650,664 A | 7/1997 | Sakamoto | 257/764 |
| 5,659,332 A * | 8/1997 | Ishii et al. | 345/104 |
| 5,681,675 A | 10/1997 | Kurauchi et al. | |
| 5,705,829 A | 1/1998 | Miyanaga et al. | 257/66 |
| 5,706,064 A | 1/1998 | Fukunaga et al. | |
| 5,710,606 A | 1/1998 | Nakajima et al. | 349/42 |
| 5,723,878 A | 3/1998 | Yanai | |
| 5,739,880 A | 4/1998 | Suzuki et al. | 349/110 |
| 5,777,594 A * | 7/1998 | Miyawaki | 345/102 |
| 5,780,872 A | 7/1998 | Misawa et al. | 257/72 |
| 5,782,665 A * | 7/1998 | Weisfield et al. | 445/24 |
| 5,796,150 A | 8/1998 | Wu et al. | 257/401 |
| 5,815,226 A | 9/1998 | Yamazaki et al. | 349/111 |
| 5,818,070 A | 10/1998 | Yamazaki et al. | 257/72 |
| 5,821,138 A | 10/1998 | Yamazaki et al. | 438/166 |
| 5,821,622 A | 10/1998 | Tsuji et al. | 257/763 |
| 5,859,443 A | 1/1999 | Yamazaki et al. | 257/65 |
| 5,864,150 A | 1/1999 | Lin | 257/61 |
| 5,877,832 A * | 3/1999 | Shimada | 349/138 |
| 5,919,532 A | 7/1999 | Sato et al. | |
| 5,929,464 A | 7/1999 | Yamazaki et al. | 257/72 |
| 5,933,208 A * | 8/1999 | Kim | 349/110 |
| 5,939,731 A | 8/1999 | Yamazaki et al. | 257/59 |
| 6,001,539 A | 12/1999 | Lyu et al. | |
| 6,002,463 A * | 12/1999 | Fujikawa | 349/110 |
| 6,049,365 A * | 4/2000 | Nakashima | 349/42 |
| 6,057,823 A * | 5/2000 | Aoki et al. | 326/11 |
| 6,100,954 A | 8/2000 | Kim et al. | |
| 6,104,461 A * | 8/2000 | Zhang et al. | 349/122 |
| 6,118,505 A * | 9/2000 | Nagata et al. | 349/106 |
| 6,153,893 A * | 11/2000 | Inoue et al. | 257/408 |
| 6,175,395 B1 * | 1/2001 | Yamazaki et al. | 349/44 |
| 6,188,452 B1 | 2/2001 | Kim et al. | |
| 6,211,928 B1 * | 4/2001 | Oh et al. | 349/43 |
| 6,243,146 B1 * | 6/2001 | Rho et al. | 257/59 |
| 6,268,895 B1 * | 7/2001 | Shimada et al. | 349/110 |
| 6,271,818 B1 | 8/2001 | Yamazaki et al. | 345/92 |
| 6,300,174 B1 * | 10/2001 | Bae | 438/151 |
| 6,380,560 B1 | 4/2002 | Yamazaki et al. | 257/72 |
| 6,587,169 B1 * | 7/2003 | Yamazaki et al. | 349/110 |
| 2001/0035919 A1 * | 11/2001 | Zhang | 349/44 |

FOREIGN PATENT DOCUMENTS

| | | | |
|---|---|---|---|
| JP | 02-230126 | | 9/1990 |
| JP | 04-253028 | | 9/1992 |
| JP | 06-208136 | | 7/1994 |
| JP | 07-064110 | | 3/1995 |
| JP | 07-072473 | | 3/1995 |
| JP | 7-130652 | | 5/1995 |
| JP | 7-135318 | | 5/1995 |
| JP | 07130652 | | 5/1995 |
| JP | 07135318 | | 5/1995 |
| JP | 07-318979 | * | 12/1995 |
| JP | 08-122761 | | 5/1996 |
| JP | 08-327991 | | 12/1996 |
| JP | 03-258199 | | 10/1997 |
| JP | 10-096963 | | 4/1998 |
| JP | 10090719 | | 4/1998 |
| JP | 10-133189 | | 5/1998 |
| JP | 10-142628 | | 5/1998 |
| JP | 10-206888 | | 8/1998 |

* cited by examiner

REFLECTION TYPE DISPLAY DEVICE USING A LIGHT SHADING FILM WITH A LIGHT SHADING MATERIAL EVENLY DISPERSED THROUGHOUT

This is a continuation of U.S. application Ser. No. 09/605,750 filed Jun. 27, 2000 now U.S. Pat. No. 6,400,434, which is a continuation of U.S. application Ser. No. 09/018,078 filed Feb. 3, 1998 (now U.S. Pat. No. 6,115,094). It further claims priority under 35 USC §119 from Japanese application no. 9-3 8416, filed Feb. 6, 1997.

BACKGROUND OF THE INVENTION

1. Field of the Invention

The present invention relates to a reflection type display device constituted by semiconductor devices using thin film semiconductors, and particularly to a structure of a reflection type liquid crystal display device. Also, the present invention relates to an electronic device using the reflection type display device.

2. Description of the Related Art

In recent years, since a portable information terminal equipment (portable equipment) such as a mobile computer and a portable telephone (including PHS) has rapidly come into wide use, a reflection type liquid crystal display device attracts a great deal of attention. Since the reflection type liquid crystal display device does not require backlight as a light source, it is possible to make the portable equipment miniaturized, lightened, and decreased in consumption of electric power.

Here, a conventional process of manufacturing a pixel matrix circuit constituting a reflection type liquid crystal display device will be described in brief. The pixel matrix circuit is a circuit in which thin film transistors (TFT) for controlling an electric field applied to a liquid crystal are arranged in matrix, and constitutes an image display region of a liquid crystal display device.

Figure 2A:
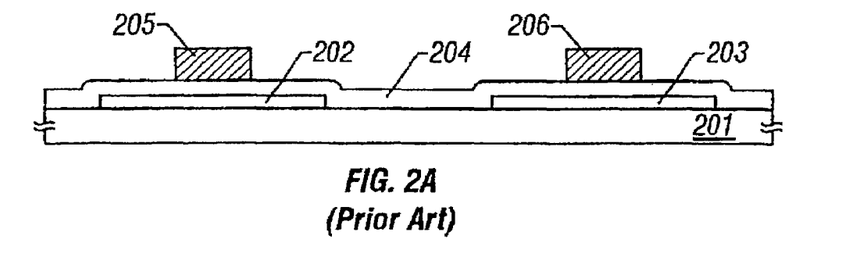
FIGS. 2(A) to 2(D) are views showing manufacturing steps of a pixel matrix circuit.

In FIG. 2(A), 201 denotes a substrate having an insulating surface, 202 denotes an active layer of a first pixel TFT, and 203 denotes an active layer of a second pixel TFT. A distance between the first pixel TFT and the second pixel TFT corresponds to a pixel pitch, and has a tendency to become short as the display becomes highly minute.

Reference numeral 204 denotes a gate insulating film. Gate electrodes 205 and 206 are formed thereon. The gate electrodes 205 and 206 are connected to not-shown gate lines. In this way, the state shown in FIG. 2(A) is obtained.

Figure 2B:
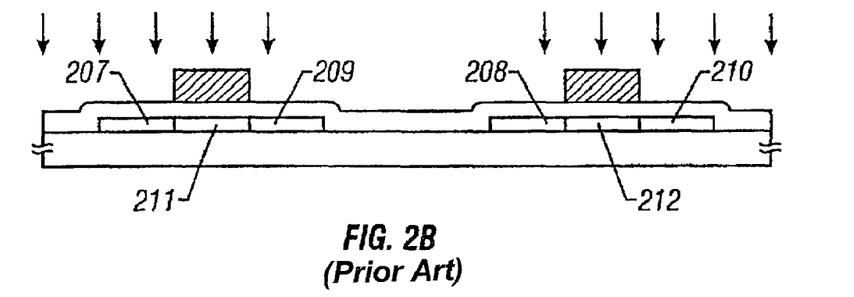

Next, an impurity ion for giving one conductivity (phosphorus (P) for an N-type, and boron (B) for a p-type) is added into the active layers 202 and 203. As a result, source regions 207 and 208, drain regions 209 and 210, and channel formation regions 211 and 212 are formed (FIG. 2(B)).

Figure 2C:
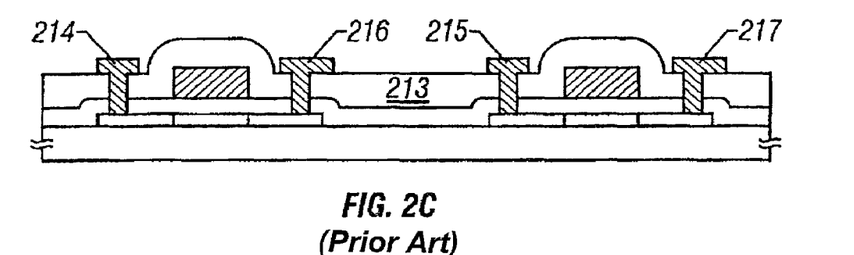

Next, a first interlayer insulating film 213 is formed, contact holes are made, and source electrodes 214 and 215 and drain electrodes 216 and 217 are formed. In this way, the state shown in FIG. 2(C) is obtained.

Further, a second interlayer insulating film 218 is formed, and a black mask 219 is formed thereon. A third interlayer insulating film 220 is formed thereon, and finally pixel electrodes 221 are formed. The respective pixel electrodes 221 are made of a metal thin film which reflects incident light, so that the pixel electrodes are made to have a function as a reflecting electrode (FIG. 2(D)).

Figure 2D:
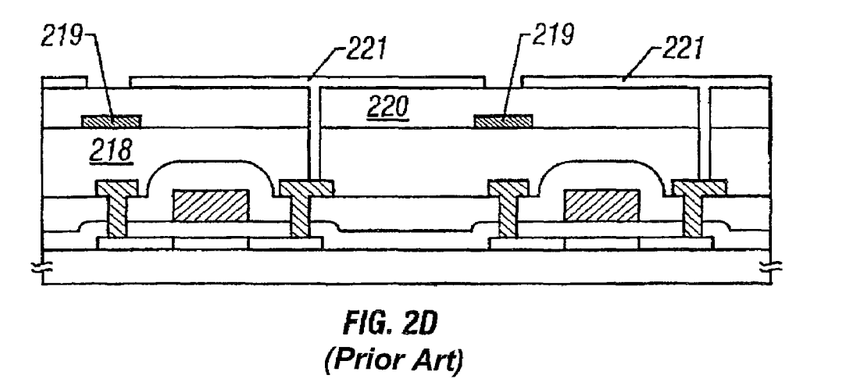

At this time, the black mask 219 is disposed under a region which is a gap between the pixel electrodes (reflecting electrodes) 221. In FIG. 2(D), although the black mask appears to be individual patterns, all the patterns are actually connected in matrix. The black mask 219 arranged in this manner serves to block light leaked from the gap of the pixel electrodes 221.

Through the above steps, the pixel matrix circuit as shown in FIG. 2(D) is completed. Then, by a well-known cell assembling step, a liquid crystal is held between the substrate on which the pixel matrix circuit is formed and an opposite substrate, so that a reflection type liquid crystal display device is completed.

As an example different from the structure shown in FIG. 2(D), it is also possible to use the source electrodes 214 and 215 as black masks by adjusting the source electrodes 214 and 215 to the gaps between the pixel electrodes 221. However, the line width of the source/drain electrodes has a tendency to be made minute, and further, in view of the patterning precision (affecting the distance of the gap) of the pixel electrode, it may be said that there is a limit to this proposal.

SUMMARY OF THE INVENTION

An object of the present invention is to provide a technique capable of greatly simplifying manufacturing steps of a reflection type liquid crystal display device.

According to an aspect of the present invention, a reflection type display device comprises an active matrix substrate on which a plurality of TFTs are formed, an opposite substrate including an opposite electrode, and a liquid crystal layer held between the active matrix substrate and the opposite substrate, and is characterized in that first wiring lines, second wiring lines, and pixel electrodes constituting the plurality of TFTs are insulated and separated from each other by insulating layers, and at least one of the insulating layers is made of an insulating film in which a carbon-based material or a pigment is dispersed.

According to another aspect of the present invention, a reflection type display device comprises an active matrix substrate on which a plurality of TFTs are formed, an opposite substrate including an opposite electrode, and a liquid crystal layer held between the active matrix substrate and the opposite substrate, and is characterized in that first wiring lines, second wiring lines, and pixel electrodes constituting the plurality of TFTs are insulated and separated from each other by insulating layers, and at least one of the insulating layers is made of an organic resin film in which a carbon-based material or a pigment is dispersed.

In the above structure, the organic resin film may be made of one kind or plural kinds of materials selected from the group consisting of polyimide, polyamide, polyimide amide, and acryl.

According to still another aspect of the present invention, an electronic device comprises an active matrix substrate on which a plurality of TFTs are formed, an opposite substrate including an opposite electrode, and a liquid crystal layer held between the active matrix substrate and the opposite substrate, and is characterized in that first wiring lines, second wiring lines, and pixel electrodes constituting the plurality of TFTs are insulated and separated from each other by insulating layers, and at least one of the insulating layers is made of an insulating film in which a carbon-based material or a pigment is dispersed.

According to still another aspect of the present invention, an electronic device comprises an active matrix substrate on which a plurality of TFTs are formed, an opposite substrate including an opposite electrode, and a liquid crystal layer held between the active matrix substrate and the opposite substrate, and is characterized in that first wiring lines, second wiring lines, and pixel electrodes constituting the plurality of TFTs are insulated and separated from each other by insulating layers, and at least one of the insulating layers is made of an organic resin film in which a carbon-based material or a pigment is dispersed.

DETAILED DESCRIPTION OF THE PREFERRED EMBODIMENTS

In the present invention, when a plurality of TFTs as switching elements of a reflection type display device are formed, an insulating film (especially an organic resin film) in which a carbon-based material or a pigment is dispersed, is used as an interlayer insulating film (insulating layer).

Figure 1A:
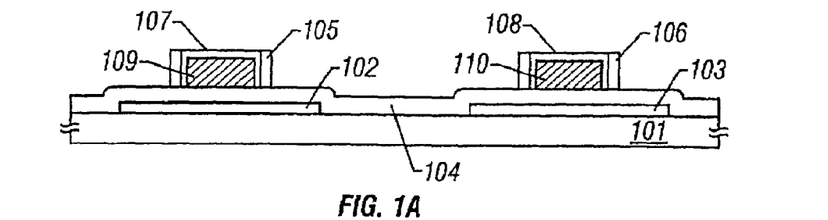
FIGS. 1(A) to 1(E) are views showing manufacturing steps of a pixel matrix circuit.
Figure 1B:
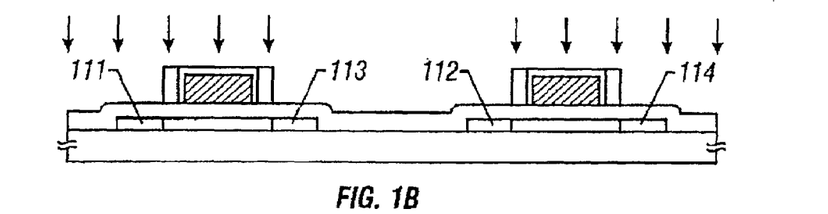
Figure 1C:
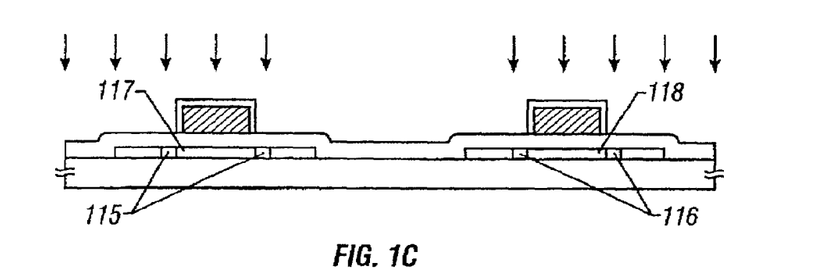
Figure 1D:
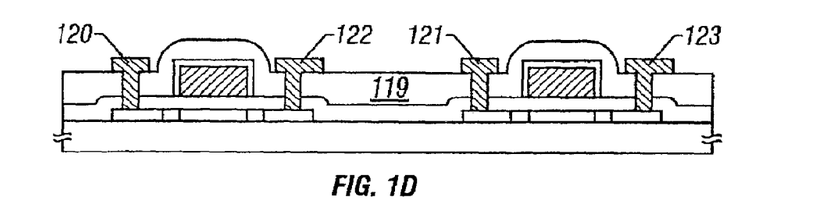
Figure 1E:
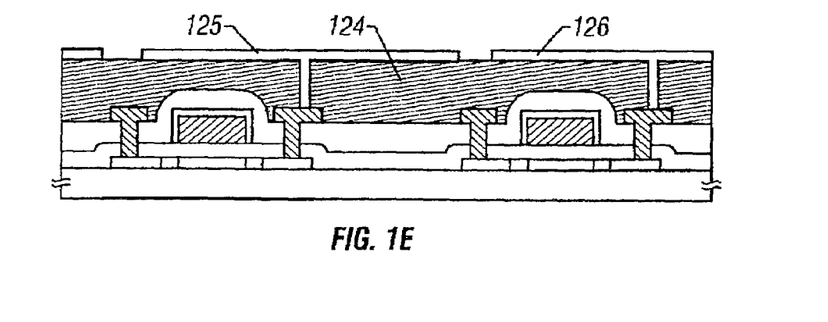

For example, as shown in FIG. 1(E), when the present invention is used for an insulating layer to insulate and separate source/drain wiring lines 120 to 123 and pixel electrodes 125 and 126, an insulating layer 124 having a light shading property can be formed.

When the present invention is used, since it is not necessary to separately provide a black mask, manufacturing steps are greatly simplified, whereby it is possible to realize the reduction of a manufacturing cost, improvement of a manufacturing yield, and improvement of a throughput.

Embodiment 1

In this embodiment, an example in which a pixel matrix circuit (only a first pixel TFT and a second pixel TFT are depicted) of a reflection type liquid crystal display device is formed, will be described with reference to FIGS. 1(A) to 1(E).

As a substrate having an insulating surface, a glass substrate 101 having an under film (not shown) on its surface is used. A quartz substrate, a ceramic substrate, a silicon substrate or the like many be used other than the glass substrate.

Next, active layers 102 and 103 made of a crystalline silicon film are formed. The active layer 102 subsequently constitutes the first pixel TFT, and the active layer 103 constitutes the second pixel TFT.

The crystalline silicon film may be formed directly by a low pressure thermal CVD method, or an amorphous silicon film may be crystallized. In this embodiment, an amorphous silicon film with a thickness of 10 to 75 nm (typically 15 to 45 nm) is crystallized by a technique disclosed in Japanese Patent Unexamined Publication No. Hei. 7-130652. The active layers 102 and 103 are formed by patterning the crystalline silicon film obtained by the technique of the publication into islands.

After the active layers 102 and 103 are formed, a silicon oxide film with a thickness of 120 nm is formed as a gate insulating film 104. A silicon nitride oxide film designated by $SiO_xN_y$, a silicon nitride film or a lamination film thereof may be used as the gate insulating film 104.

Next, an electrode pattern (not shown) made of a material mainly containing aluminum is formed on the gate insulating film 104. The electrode pattern subsequently becomes gate electrodes and gate wiring lines (these wiring lines will be referred to as first wiring lines).

Then, by two anodic oxidation steps, porous anodic oxidation films 105 and 106 and dense anodic oxidation films 107 and 108 are formed. The conditions of this anodic oxidation steps may be referred to Japanese Patent Unexamined Publication No. Hei. 7-135318. Regions of the electrode pattern not subjected to the anodic oxidation are defined as gate electrodes 109 and 110 (FIG. 1(A)).

A material which can be subjected to the anodic oxidation, such as tantalum, molybdenum or tungsten may be used other than the material mainly containing aluminum. Also, a crystalline silicon film in which one conductivity is given, may be used.

After the state shown in FIG. 1(A) is obtained, an impurity ion for giving one conductivity is added. In this embodiment, a P ion (or As ion) is added to make the pixel TFT an N-channel type. An acceleration voltage is made 80 keV and a dosage is made $1\times10^{15}$ atoms/cm$^2$.

At the step of adding the impurity ion, source regions 111 and 112 and drain regions 113 and 114 are formed in a self-aligned manner with the gate electrodes 109 and 110 and the porous anodic oxidation films 105 and 106 as masks (FIG. 1(B)).

Next, after the porous anodic oxidation films 105 and 106 are removed, a P ion (or As ion) is again added. In this ion adding step, an acceleration voltage is made 80 keV, and a dosage is made $1\times10^{14}$ atoms/cm$^2$ which is lower than that in the previous adding step.

As a result, the conductivity of the source regions 111 and 112 and the drain regions 113 and 114 is further increased, and regions 115 and 116 shaded by the previous porous anodic oxidation films 105 and 106 are added with a P ion with a concentration lower than the source/drain regions. These regions 115 and 116 are called lightly doped regions, and especially the region positioned at the side of the drain region is also called an LDD region. Further, at the same time, channel formation regions 117 and 118 in which an impurity ion is not added, are defined (FIG. 1(C)).

After the state shown in FIG. 1(C) is obtained, a heat treatment such as furnace annealing, laser annealing, or lamp annealing is carried out so that the impurity ion, which was added into the active layer, is activated. At this time, it is possible to restore the damage generated in the active layer by adding the impurity ion.

In the manner described above, after the basic portion of a TFT is completed, a first insulating layer 119 is formed, and source wiring lines 120 and 121 and drain wiring line 122 and 123 are formed through contact holes (these wiring lines are called second wiring lines).

In this way, the state shown in FIG. 1(D) is obtained. After the state shown in FIG. 1(D) is obtained, a second insulating layer 124 is formed so as to cover the first pixel TFT and the second pixel TFT. In the present invention, as the second insulating film 124, an insulating film in which a carbon-based material (including graphite) or a pigment is dispersed, is used. The carbon-based material or the pigment is sufficient if a light shading property can be given to the insulting film. Thus, it may be said that a black pigment is preferable for the pigment.

A silicon oxide film or an organic resin film may be used as the insulating film. However, in this embodiments, polyimide, polyamide, polyimide amide, acryl or the like may be used as the organic resin film.

The organic resin film has the following advantages. That is, (1) a film can be easily formed by a spin coating method, (2) a thick insulating film can be formed at a high throughput, and (3) an excellent flat surface can be obtained. Especially, acryl has such features that it is most inexpensive, is superior in flatness, and can be patterned by direct exposure because of its photosensitivity.

The second insulating layer 124 may have a lamination structure of materials selected from the group consisting of silicon oxide, silicon nitride, silicon nitride oxide, and organic resin. Even in the case of an insulating layer made of such a lamination structure, the present invention is effective if at least one layer of the lamination structure is a light shading film in which a carbon-based material or a pigment is dispersed.

After the second insulating layer 124 is formed in this way, contact holes are formed, and pixel electrodes 125 and 126 are formed. The pixel electrodes 125 and 126 are respectively connected to the drain electrodes 122 and 123, and are electrically connected to the first pixel TFT and the second pixel TFT, respectively (FIG. 1(E)).

The pixel electrodes 125 and 126 are made of a material having a high reflectance. In this embodiment, a material mainly containing aluminum is used. In the surface state of the pixel electrodes 125 and 126, it is effective to contrive such means that the surface state for a direct view type display device is made a state where roughness is provided, and the surface state for a projection type display device is made a mirror state.

Finally, a heat treatment is carried out in an atmosphere containing hydrogen, so that dangling bonds in the active layer are terminated by hydrogen. The characteristics of the TFT is greatly improved by the hydrogenating treatment. In the way described above, the pixel matrix circuit of a reflection type liquid crystal display device is completed.

As shown in FIG. 1(E), in the structure of the present invention, the entire of the insulating layer 124 under the pixel electrodes 125 and 126 function as a black mask (light shading film), so that light invading through the gaps between the pixel electrodes does not reach the active layers. That is, it is possible to completely protect the active layers from incident light without being influenced by a TFT structure or a TFT size.

As described above, according to the present invention, it is possible to assure the complete light shading property even if a conventional step of forming a black mask, a step of patterning the black mask, and a step of forming an insulating layer to insulate and separate the black mask from the pixel electrode, are omitted.

Accordingly, it is possible to simplify the manufacturing steps of the reflection type display device, and to greatly improve the throughput and yield. Also, it is possible to greatly reduce the manufacturing cost.

Embodiment 2

In this embodiment, an example of a process of manufacturing an active matrix reflection type liquid crystal display device in which a pixel matrix circuit and a driver circuit are integrated on the same substrate, will be described with reference to FIGS. 3(A) to 3(D). However, it should be noted that the present invention is not limited to this embodiment.

Figure 3A:
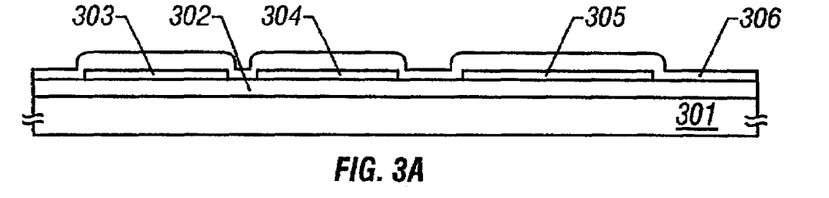
FIGS. 3(A) to 3(D) are views showing manufacturing steps of a reflection type liquid crystal display device.
Figure 3B:
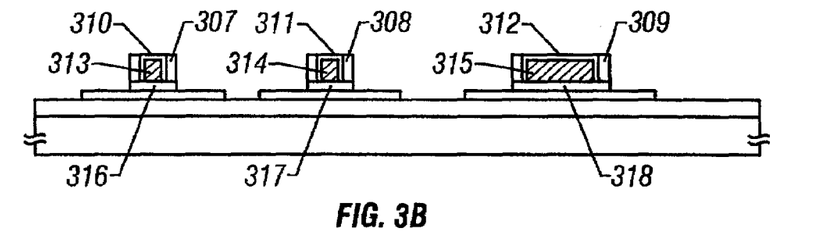

In FIG. 3(A), 301 denotes a glass substrate, 302 denotes an under film (silicon oxide film), 303 to 305 denote active layers, and 306 denotes a gate insulating film formed by a CVD method. The active layers 303 to 305 may be formed in accordance with the steps shown in the embodiment 1. Incidentally, 303 denotes an active layer of an N-channel TFT constituting a CMOS circuit, 304 denotes an active layer of a p-channel TFT constituting the CMOS circuit, and 305 denotes an active layer of a pixel TFT.

Next, a not-shown metal film mainly containing aluminum is formed, and an origin of a later gate electrode is formed by patterning. Here, a technique disclosed in Japanese Patent Unexamined Publication No. Hei. 7-135318 is employed. By using the technique disclosed in the publication, porous anodic oxidation films 307 to 309, dense anodic oxidation films 310 to 312, and gate electrodes 313 to 315 are formed.

Next, the gate insulating film 306 is etched by a dry etching method using the gate electrodes 313 to 315 and the porous anodic oxidation films 307 to 309 as masks, so that gate insulating films 316 to 318 are formed. Then the porous anodic oxidation films 307 to 309 are removed. In this way, there is obtained a state in which the ends of the gate insulating films 316 to 318 are exposed (FIG. 3(B)).

Figure 3C:
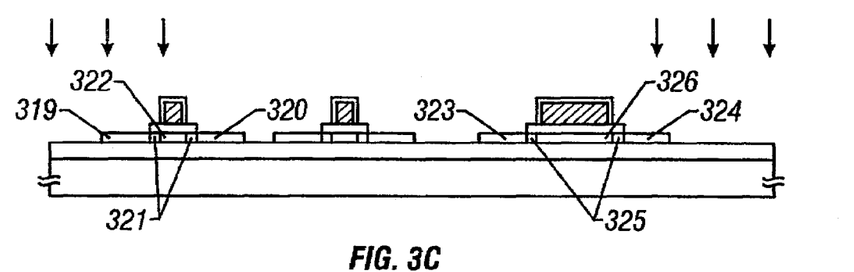
Figure 3D:
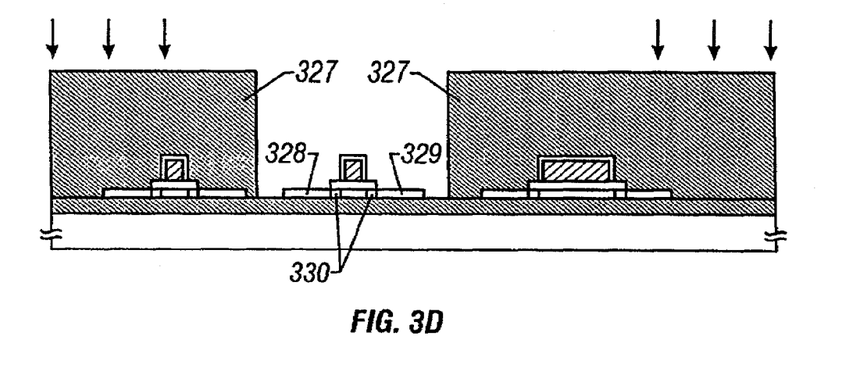

Next, an impurity ion for giving an N-type is added in two steps. In this embodiment, the first addition of the impurity ion is carried out at a high acceleration voltage to form an n-region. At this time, since the acceleration voltage is high, the impurity ion is added not only into the exposed surface of he active layer, but also into the portions under the ends of the exposed gate insulating films. Further, the second addition of the impurity ion is carried out at a low acceleration voltage to form an n-region. At this time, since the acceleration voltage is low, the gate insulating films function as masks.

Through the above steps, there are formed a source region 319, a drain region 320, a lightly doped region 321, and a channel formation region 322 of the N-channel TFT constituting the CMOS circuit. Also, there are formed a source region 323, a drain region 324, a lightly doped region 325, and a channel formation region 326 of the N-channel TFT constituting the pixel TFT (FIG. 3(C)).

In the state shown in FIG. 3(C), a P-channel TFT constituting the CMOS circuit has the same structure as the N-channel TFT.

Next, a resist mask is provided to cover the N-channel TFT, and an impurity ion for giving a P-type is added. This step is also divided into two parts which are carried out similarly to the above-mentioned impurity adding step, so that a source region 328, a drain region 329, a lightly doped region 330 and a channel formation region 331 of the P-channel TFT constituting the CMOS circuit, are formed (FIG. 3(D)).

After the active layer is completed in the manner described above, similarly to the embodiment 1, activation of the impurity ion and recovery of damage generated at the ion addition are made. Then, similarly to the embodiment 1, a first insulating layer 332, source wiring lines 333 to 335, drain wiring lines 336 and 337 are formed to obtain the state shown in FIG. 4(A).

Figure 4A:
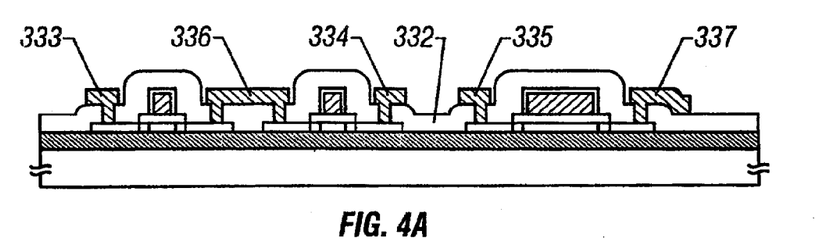
FIGS. 4(A) to 4(C) are views showing manufacturing steps of a reflection type liquid crystal display device.

Next, a second insulating layer 340 made of a lamination structure of a silicon oxide film 338 and a polyimide film 339 in which a black pigment is dispersed, is formed. Also in this embodiment, the second insulating layer 340 functions as a black mask, too.

Figure 4B:
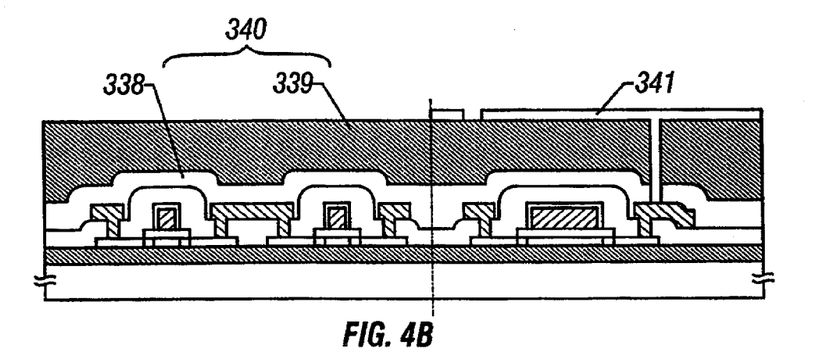

After the second insulating layer 340 is formed, a contact hole is formed and a pixel electrode 341 made of a material mainly containing aluminum is formed. Further, the entire is hydrogenated so that the active matrix substrate shown in FIG. 4(B) is completed. In FIG. 4(B), a driver circuit is shown in the left side and a pixel matrix circuit is shown at the right side.

Next, an orientation film 342 is formed on the uppermost layer (on the pixel electrode 341) of the active matrix substrate. Further, there is provided an opposite substrate 345 in which an opposite electrode 343 and an orientation film 344 are formed. A color filter may be provided on the opposite substrate according to necessity.

Figure 4C:
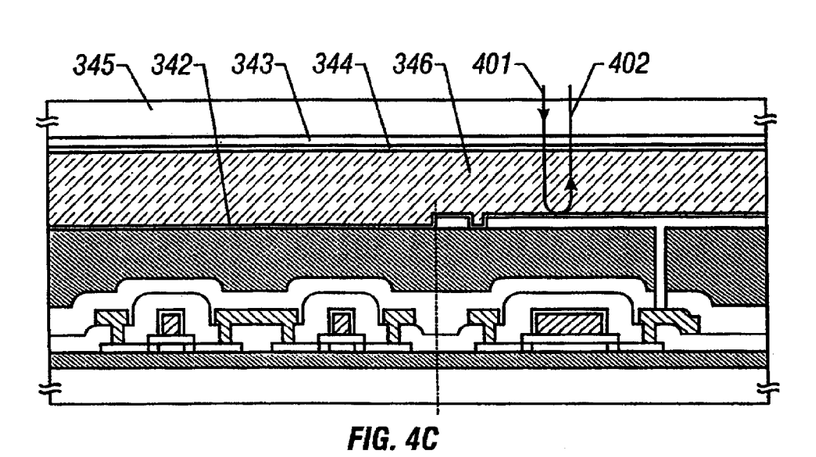

A sealing material is printed on the opposite substrate, spacers are sprinkled to the active matrix substrate, and both the substrates are bonded to each other. Further, a liquid crystal material is injected between both the substrates and is sealed by the sealing material. In this way, a liquid crystal layer 346 is held between the opposite substrate and the active matrix substrate.

In the way described above, the active matrix reflection type liquid crystal display device as shown in FIG. 4(C) is completed. At the time of operation, as shown in FIG. 4(C), incident light 401 is reflected by the pixel electrode 341 so that an image is displayed. Reference numeral 402 denotes reflected light.

In the case where the driver circuit and the pixel matrix circuit are formed on the same substrate as in this embodiment, a material to block an optical path, like the pixel electrode 341, does not exist above the driver circuit. Even in such a case, since the second insulating layer 340 functions as the black mask, it is possible to protect the active layers from light.

Thus, it is possible to easily apply the present invention even to, for example, a system-on-panel structure in which a logic circuit such as a clock control circuit, a CPU, and a memory is mounted in addition to the driver circuit.

Embodiment 3

In the embodiment 1 and the embodiment 2, a planar type TFT has bee described as an example. The present invention is not naturally influenced by a TFT structure. Thus, there is no problem even if individual TFTs constituting the circuit is a reverse stagger type TFT or a multigate type TFT.

Embodiment 4

In the embodiment 2, there has been described an example in which polyimide is used as a base material of the second insulating layer, and the black pigment is used as a dispersoid (dispersed substance). However, in the present invention, a solution coated insulating film (for example, PSG, BSG and the like) may be used as a base material.

In that case, there is obtained an advantage that an insulating layer having heat resistance higher than the case where the organic resin film is used as the base material, can be formed.

Embodiment 5

In the embodiment 1 and the embodiment 2, the glass substrate in which the under film (not shown) is formed on the surface, is used as the substrate having an insulating surface. When the solution coated insulating film shown in the embodiment 4 is used as the under film, it is possible to make the under film itself function as the black mask.

Figure 5:
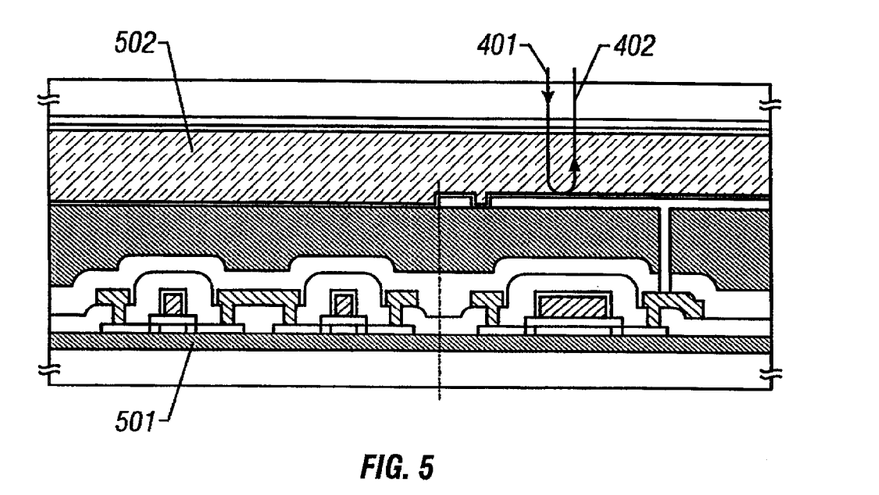
FIG. 5 is a sectional view showing a section of a reflection type liquid crystal display device.

FIG. 5 is a sectional view showing a reflection type liquid crystal display device used in this embodiment. Reference numeral 501 denotes an under layer formed by dispersing graphite into a solution coated insulating film of PSG or the like, 502 denotes an insulating layer formed by dispersing graphite into an organic resin film. Of course, carbon or black pigments may be used instead of graphite.

When the structure as shown in FIG. 5 is formed, since all the incident light from the rear side of the active matrix substrate can be blocked, the effect of the present invention can be further improved.

Embodiment 6

In this embodiment, electronic device to which the reflection type display device of the present invention can be applied, will be described with reference to FIGS. 6(A) to 6(E). The electronic devices using the present invention include a (digital) video camera, a (digital) still camera, a projector, a head mount display, a car navigation system, a personal computer, a portable information terminal (mobile computer, portable telephone, etc.) and the like.

Figure 6A:
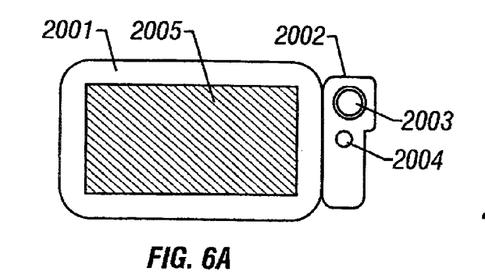
FIGS. 6(A) to 6(E) are views for explaining examples of applied products.

FIG. 6(A) shows a mobile computer, which is constituted by a main body 2001, a camera portion 2002, an image receiving portion 2003, an operation switch 2004, and a display device 2005. The present invention can be applied to the display device 2005. Incidentally, some types of mobile computers include a built-in PHS (Personal Handyphone System) circuit.

Figure 6B:
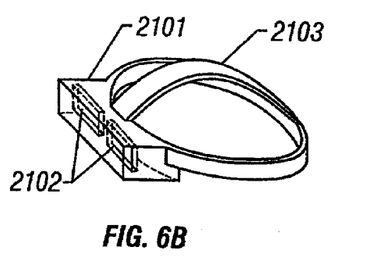

FIG. 6(B) shows a head mount display, which is constituted by a main body 2101, a display device 2102, and a band portion 2103. When the present invention is applied to the display device 2102, the cost of the device can be greatly reduced.

Figure 6C:
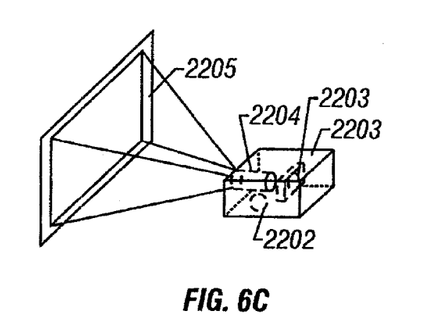

FIG. 6(C) shows a front type projector, which is constituted by a main body 2201, a light source 2202, a display device 2203, an optical system 2204, and a screen 2205. The present invention can be applied to the display device 2203. Although the drawing shows a type in which an image is projected to a screen, a rear type projector in which an image is projected from the rear side to a TV screen, may be made.

Figure 6D:
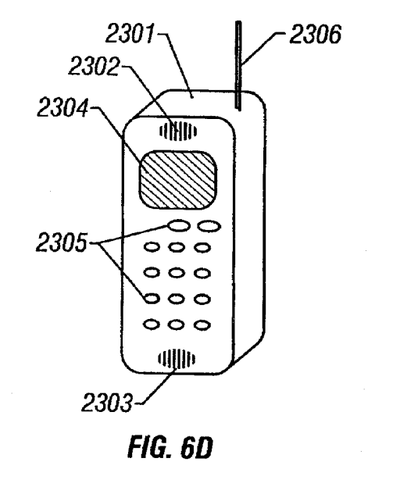

FIG. 6(D) shows a portable telephone, which is constituted by a main body 2301, an audio output portion 2302, an audio input portion 2303, a display device 2304, an operation switch 2305, and an antenna 2306. When the present invention is applied to the display device 2304, a monitor superior in visibility can be mounted.

Figure 6E:
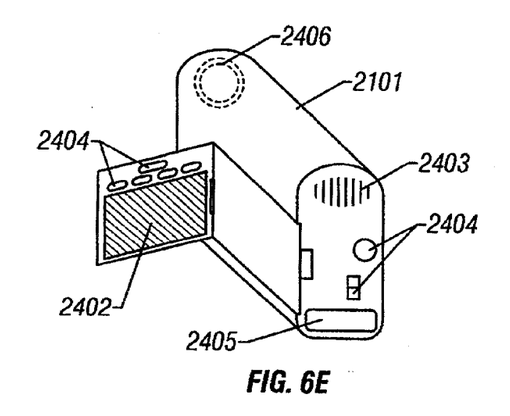

FIG. 6(E) shows a video camera, which is constituted by a main body 2401, a display device 2402, an audio input portion 2403, an operation switch 2404, a battery 2405, and an image receiving portion 2406. The present invention can be applied to the display device 2402.

As described above, the application range of the present invention is extremely wide, and the present invention can be applied to display mediums of any fields. Especially, a reflection type display device which does not require backlight, is most suitable for a portable information terminal equipment such as a mobile computer, a portable telephone, and a video camera. Of course, the present invention can be applied to a case in which backlight is used, such as a projector, without any problem.

By using the present invention, it is possible to use an insulating layer itself, which insulates and separates various wiring lines or electrodes, as a black mask. Thus, it becomes unnecessary to provide a black mask separately, so that manufacturing steps can be greatly simplified.

Accordingly, when a reflection type display device is manufactured, it is possible to realize the improvement of a throughput, improvement of a yield, and reduction of a manufacturing cost. Also, it is possible to reduce the cost of an electronic device provided with such a reflection type display device.

What is claimed:

1. A portable information terminal having a reflection type display device, said reflection type display device comprising:
   a pixel thin film transistor provided over a substrate;
   an insulating film over said pixel thin film transistor;
   a light shading film having an uneven downward surface, said uneven downward surface located over said pixel thin film transitor, said light shading film comprising an organic resin; and
   a pixel electrode provided over said light shading film, wherein said light shading film covers entirely said insulating film.

2. A device according to claim 1 wherein said substrate comprises a glass.

3. A device according to claim 1 wherein said light shading material is a carbon-based material.

4. A device according to claim 1 wherein said light shading material includes a pigment.

5. A portable information terminal having a reflection type display device, said reflection type display device comprising:
   a pixel thin film transistor provided over a substrate;
   an insulating film over said pixel thin film transistor;
   a light shading film having an uneven downward surface, said uneven downward surface located over said pixel thin film transistor, said light shading film comprising an organic resin; and
   a pixel electrode having a rough surface provided over said light shading film; and
   wherein said light shading film covers entirely said insulating film.

6. A device according to claim 5 wherein said substrate comprises a glass.

7. A device according to claim 5 wherein said light shading material is a carbon-based material.

8. A device according to claim 5 wherein said light shading material includes a pigment.

9. A portable information terminal having a reflection type display device, said reflection type display device comprising:
   a pixel thin film transistor provided over a substrate;
   a thin film transistor for a driver circuit over said substrate;
   an insulating film over said pixel thin film transistor and said thin film transistor for said driver circuit;
   a light shading film having an uneven downward surface, said uneven downward surface located over said pixel thin film transistor and said thin film transistor for said driver, said light shading film comprising an organic resin; and
   a pixel electrode provided over said light shading film, and
   wherein said light shading film covers entirely said insulating film.

10. A device according to claim 9 wherein said substrate comprises a glass.

11. A device according to claim 9 wherein said light shading material is a carbon-based material.

12. A device according to claim 9 wherein said light shading material includes a pigment.

13. A portable information terminal having a reflection type display device, said reflection type display device comprising:
    a substrate;
    a first light shading film over said substrate;
    a pixel thin film transistor provided over said first light shading film;
    an insulating film over said pixel thin film transistor;
    a light shading film having an uneven downward surface, said uneven downward surface located over said pixel thin film transistor, said light shading film comprising an organic resin; and
    a pixel electrode provided over said light shading film, wherein said light shading film covers entirely said insulating film.

14. A portable information terminal according to claim 13 wherein said light shading material is a carbon-based material.

15. A portable information terminal according to claim 13 wherein said light shading material includes a pigment.

16. A portable telephone comprising:
    an audio output portion;
    an audio input portion; and
    a reflection type display device,
    wherein the reflection type display device comprises:
    a pixel thin film transistor provided over a substrate;
    an insulating film over said pixel thin film transistor;
    a light shading film having an uneven downward surface, said uneven downward surface located over said pixel thin film transistor, said light shading film comprising an organic resin; and
    a pixel electrode provided over said light shading film, wherein said light shading film covers entirely said insulating film.

17. A portable telephone according to claim 16 wherein said light shading material is a carbon-based material.

18. A portable telephone according to claim 16 wherein said light shading material includes a pigment.

19. A portable telephone comprising:
    an audio output portion;
    an audio input portion; and
    a reflection type display device,
    wherein the reflection type display device comprises:
    a pixel thin film transistor provided over a substrate;
    an insulating film over said pixel thin film transistor;
    a light shading film having an uneven downward surface, said uneven downward surface located over said pixel thin film transistor, said light shading film comprising an organic resin; and
    a pixel electrode having a rough surface provided over said light shading film,
    wherein said light shading film covers entirely said insulating film.

20. A portable telephone according to claim 19 wherein said light shading material is a carbon-based material.

21. A portable telephone according to claim 19 wherein said light shading material includes a pigment.

22. A portable telephone comprising:
    an audio output portion;
    an audio input portion; and
    a reflection type display device,
    wherein the reflection type display device comprises:
    a pixel thin film transistor provided over a substrate;
    a thin film transistor for a driver circuit over said substrate;
    an insulating film over said pixel thin film transistor and said thin film transistor for said driver circuit;

a light shading film having an uneven downward surface, said uneven downward surface located over said pixel thin film transistor and said thin film transistor for said driver, said light shading film comprising an organic resin; and a pixel electrode provided over said light shading film, wherein said light shading film covers entirely said insulating film.

23. A portable telephone according to claim 22 wherein said light shading material is a carbon-based material.

24. A portable telephone according to claim 22 wherein said light shading material includes a pigment.

25. A portable telephone comprising:
an audio output portion;
an audio input portion; and
a reflection type display device,
wherein the reflection type display device comprises:
a substrate;
a first light shading film over said substrate;
a pixel thin film transistor provided over said first light shading film;
an insulating film over said pixel thin film transistor;
a light shading film having an uneven downward surface, said uneven downward surface located over said pixel thin film transistor, said light shading film comprising an organic resin; and
a pixel electrode provided over said light shading film,
wherein said light shading film covers entirely said insulating film.

26. A portable telephone according to claim 25 wherein said light shading material is a carbon-based material.

27. A portable telephone according to claim 25 wherein said light shading material includes a pigment.

28. A projector comprising:
a light source;
a reflection type display device;
an optical system; and
a screen,
wherein the reflection type display device comprises:
a pixel thin film transistor provided over a substrate;
an insulating film over said pixel thin film transistor;
a light shading film having an uneven downward surface, said uneven downward surface located over said pixel thin film transistor, said light shading film comprising an organic resin to provide a leveled upper surface over said uneven downward surface located over said pixel thin film transistor; and
a pixel electrode provided over said leveled upper surface,
wherein said light shading film covers entirely said insulating film.

29. A projector according to claim 28 wherein said light shading material is a carbon-based material.

30. A projector according to claim 28 wherein said light shading material includes a pigment.

31. A projector comprising:
a light source;
a reflection type display device;
an optical system; and
a screen,
wherein the reflection type display device comprises:
a pixel thin film transistor provided over a substrate;
a thin film transistor for a driver circuit over said substrate;
an insulating film over said pixel thin film transistor and said thin film transistor for said driver circuit;
a light shading film having an uneven downward surface, said uneven downward surface located over said pixel thin film transistor and said thin film transistor for said driver, said light shading film comprising an organic resin to provide a leveled upper surface over said uneven downward surface located over said pixel thin film transistor and said thin film transistor for said driver; and
a pixel electrode provided over said leveled upper surface,
wherein said light shading film covers entirely said insulating film.

32. A projector according to claim 31 wherein said light shading material is a carbon-based material.

33. A projector according to claim 31 wherein said light shading material includes a pigment.

34. A projector comprising:
a light source;
a reflection type display device;
an optical system; and
a screen,
wherein the reflection type display device comprises:
a substrate;
a first light shading film over said substrate;
a pixel thin film transistor provided over said first light shading film;
an insulating film over said pixel thin film transistor;
a light shading film having an uneven downward surface, said uneven downward surface located over said pixel thin film transistor, said light shading film comprising an organic resin to provide a leveled upper surface over said uneven downward surface located over said pixel thin film transistor; and
a pixel electrode provided over said leveled upper surface,
wherein said light shading film covers entirely said insulating film.

35. A projector according to claim 34 wherein said light shading material is a carbon-based material.

36. A projector according to claim 34 wherein said light shading material includes a pigment.

* * * * *